INVENTOR.
Jiří Pondělíček
BY
Richard Low
Ag't

Oct. 10, 1967 J. PONDĚLÍČEK 3,346,800

VOLTAGE CONTROL CIRCUIT ARRANGEMENT

Filed April 19, 1965

4 Sheets-Sheet 2

INVENTOR.

Jiří Pondělíček

BY

VOLTAGE CONTROL CIRCUIT ARRANGEMENT

Filed April 19, 1965

4 Sheets-Sheet 3

INVENTOR.
Jiří Pondělíček
BY
Richard Low
Ag't

VOLTAGE CONTROL CIRCUIT ARRANGEMENT

Filed April 19, 1965

INVENTOR.
Jiří Pondělíček
BY Richard Low
Ag't

United States Patent Office 3,346,800
Patented Oct. 10, 1967

3,346,800
VOLTAGE CONTROL CIRCUIT ARRANGEMENT

Jiří Pondělíček, Prague, Czechoslovakia, assignor to Zavody V.I. Lenina Plzen, narodni podnik, Plzen, Czechoslovakia Filed Apr. 19, 1965, Ser. No. 449,224
Claims priority, application Czechoslovakia, Apr. 28, 1964, 2,479/64
10 Claims. (Cl. 322—28)

The invention relates to a voltage control circuit arrangement, especially for increasing the control accuracy of a source of voltage. This circuit arrangement is particularly intended for controlling the alternating voltage of synchronous compound generators. The main object of this control is to keep the voltage pf. the source at a predetermined constant value regardless of the variable load of the source. The circuit arrangement in accordance with the invention permits, of course, also adjustment of another constant value of the said voltage source.

The control is related with the source of voltage in such a manner that the control step is accomplished in that part of the source, or group connected therewith, which affects directly the magnitude of the voltage source. For example, in synchronous compound generators, the control step is accomplished by a change in the premagnetization of the current transformers. In each phase of the line coming out from the generator is connected the primary winding of one current transformer, the secondary winding of which is connected through a rectifier with the field winding of the synchronous generator. The premagnetization windings of all current transformers are connected in series in the circuit of the magnetization current the magnitude of which is derived from the load of the voltage source proper.

In synchronous generators provided with an exciting dynamo, the control step is accomplished, for example, in one part of the magnetization winding of this exciting dynamo.

The fundamental feature of the invention consists in a control circuit comprising in a series arrangement: a limiting block, a monostable multivibrator, and a control block. Further a special pulse generator is connected in the junction point between the limiting block and the monostable multivibrator of this control circuit. The input of the limiting block is fed with a D.C. voltage which is proportional to the voltage of the controlled source. The control block which is located at the end of the described control circuit is interposed in the circuit of the magnetization winding which is fed from the source of the magnetization current. The control block controls the magnitude of the magnetization current in the circuit of the magnetization winding, in dependance on the width of the pulses supplied into the control block. The pulse width is determined in the monstable multivibrator in dependence on the voltage in the junction point.

The main advantage of the circuit arrangement in accordance with the invention is an increase in the control accuracy which responds sensitively to very small changes in the voltage of the controlled source. The control in accordance with the invention accomplished the respective control step with a minimum time delay.

Another advantage of the invention is in the fact that the circuit of the magnetization winding is closed in such a manner that the magnetization current does not pass through the electronic elements used in the circuit arrangement. In this manner these electronic elements are protected against current surges and this increases the life and operational reliability of the circuit arrangement in accordance with the invention.

Another advantage of the invention is in the fact that adjustment of the selected value of the constant voltage of the controlled source is accomplished by simple steps in the control circuit proper; these steps are accomplished by merely changing the position of one or two variable resistors in the respective blocks of the control circuit. This adjustment can be carried out continuously due to the construction of the said variable resistor.

A further advantage of the invention is considerable insensitivity of the control circuit to variations in the supply voltage of some of its blocks.

The invention will be best understood from the following specification to be read in conjunction with the accompanying drawings illustrating schematically several examples of embodiment of the invention and some details thereof. In the drawings.

Figures 1, 2, 3, 4:
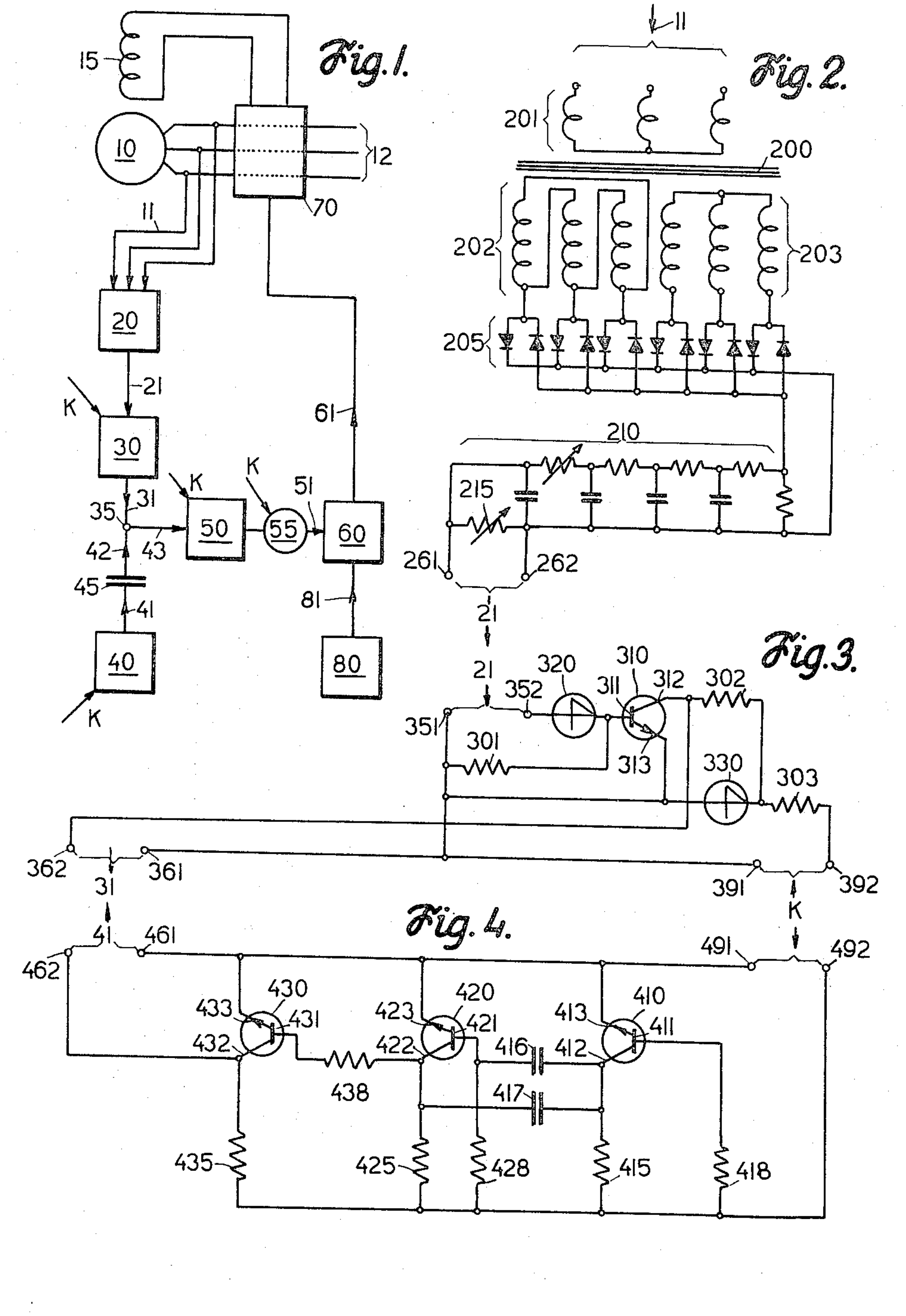
FIG. 1 shows an example of the general circuit arrangement for controlling the voltage of a synchronous compound generator.
FIG. 2 shows in more detail the circuit diagram of the transformation block used in the circuit arrangement of FIG. 1.
FIG. 3 shows in more deail the circuit diagram of the limiting block used in the circuit arrangement of FIG. 1.
FIG. 4 shows in more detail the circuit diagram of the pulse generator used in the circuit arrangement of FIG. 1.
Figure 13:
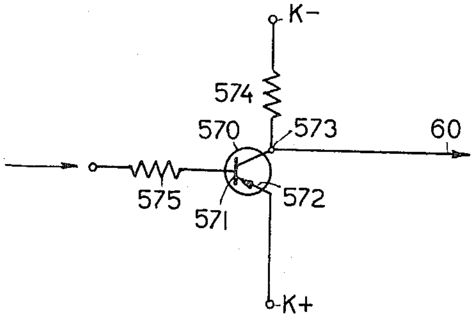
Figures 10A, 10B, 10C, 10D, 10E, 10F, 10G, 10H, 11, 12F, 12G, 12H:
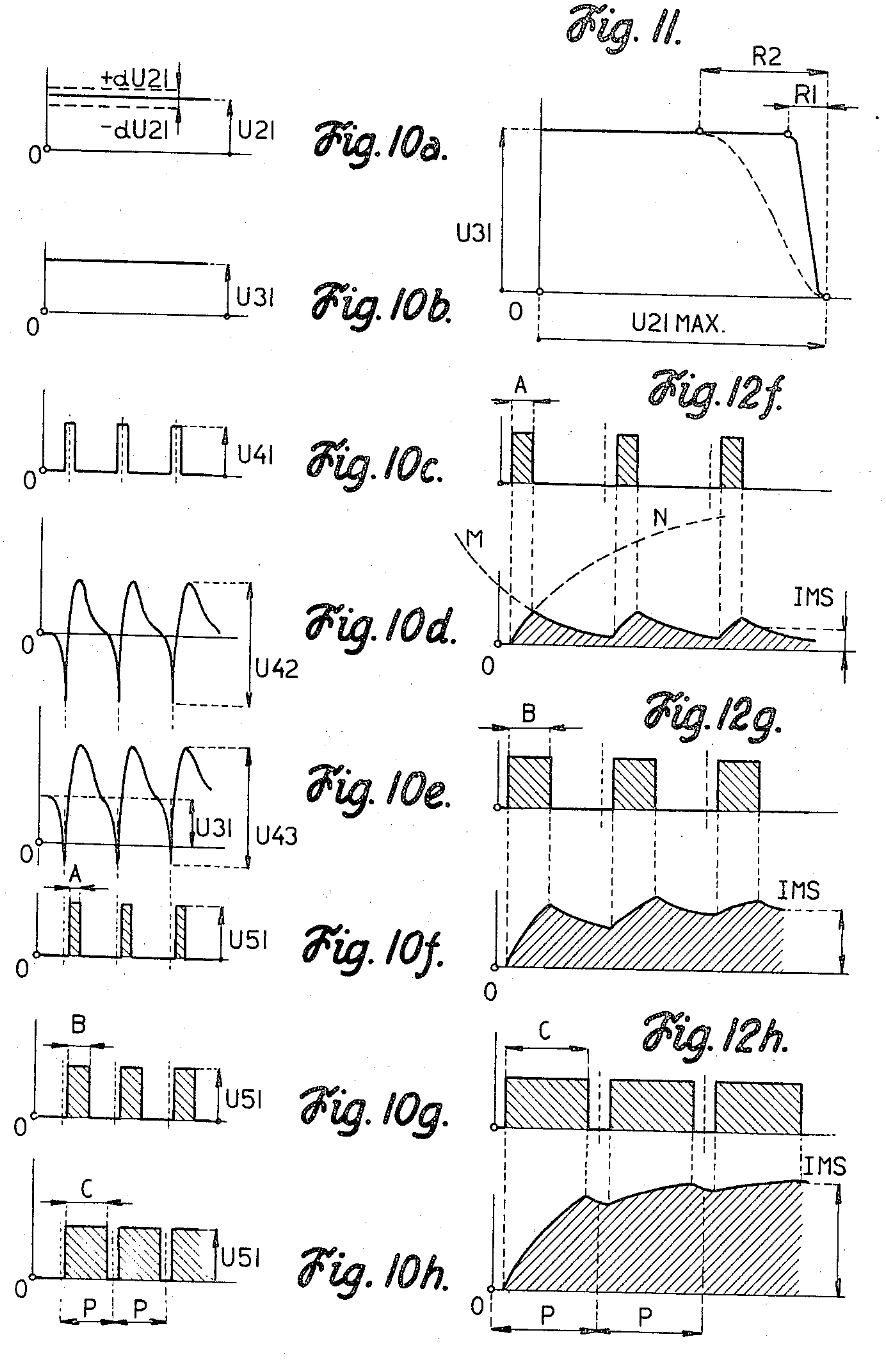

FIGS. 10*a*–10*h* show diagrams of the voltage curves at various places of the circuit arrangement in accordance with FIG. 1;

FIG. 11 shows the control voltage curve;

FIG. 12 shows diagrams illustrating how the magnetization current is produced; and FIG. 13 shows the circuit diagram of an inverting network or insertion used in the circuit arrangement in accordance with the invention.

Referring now more particularly to the figures:

In the embodiment illustrated in FIG. 1, the circuit arrangement in accordance with the invention is required to maintain a constant voltage in the synchronous compound generator 10. This generator 10 is connected with the line 12 and the voltage of the generator is affected by a change in the field current in the field winding 15. The latter is connected with the source control block 70. As will be described later in more detail, the source control block 70 is connected not only with the line 12, but also with the circuit arrangement in accordance with the invention through a connection line 11 and, eventually, through an interposed transformation block 20 and the line 21. The circuit arrangement in accordance with the invention comprises in a series arrangement: a limiting block 30 fed with direct current from the line 21, a multivibrator block 50 connected through the lines 31 and 43 and the junction point 35 with the limiting block 30, and a control block 60 connected through the line 51 with the multivibrator block 50.

If the source control block 70 comprises current transformers with a premagnetizing winding, it should be noted that if the magnetizing current passing through this premagnetizing winding is increased, the current in the secondary winding of the transformer decreases, and thus decreases also the field current. This means that there is indirect dependence between the magnetization current and the field current proper, in this case. Because of this, there is interposed for this case in the line 51 and inverting network 55 the nature and performance of which will be explained in more detail below. The output line 61 of the control block 60 which is connected to the already mentioned source control block 70 completes the entire circuit.

A further member of this circuit is the pulse generator 40 which is connected by means of the line 41 with one electrode of the capacitor 45 the second electrode of which is connected by means of the line 42 with the junction point 35. The limiting block 30, the pulse generator 40 and the multivibrator block 50, and eventually also the inverting network 55 are fed from a source of constant voltage, as indicated symbolically by the arrows K. The control block 60 is fed through the line 81 from the magnetizing current source 80.

The transformation block 20 employed in the embodiment of the invention illustrated in FIG. 1, has been shown in more detail in FIG. 2. This transformation block comprises a transformer 200 with a primary winding 201 fed through the connecting line 11 from the line 12. The transformer 200 has two secondary windings 202 and 203 in delta or star connection respectively. The secondary windings 202 and 203 feed a group 205 of semiconductor rectifiers. After this group 205 of semiconductor rectifiers there is arranged a smoothing filter 210 comprising capacitors and resistors. The output of the smoothing filter 210 comprises a variable resistor 215 which serves to adjust the required value of the direct current output voltage U21 across the line 21, or across the output terminals 261 and 262, cp. also FIG. 10*a*. In this case, voltage control in accordance with the invention is achieved in that, in a certain control region, if the source voltage is increased, the magnetizing current is automatically increased so that if a certain voltage of the source is attained, cp. $U21_{max.}$ in FIG. 11, the magnetizing current reaches its maximum value. If the voltage is further increased, the magnetizing current remains at its maximum value. It should be noted that the control in accordance with the invention operates also in the opposite sense, that is if the maximum voltage of the source decreases to the operational voltage.

The operation of the entire circut arrangement in accordance with the invention will now be theoretically explained with reference to FIG. 1 and the diagram in FIGS. 10, 11, 12 connected therewith.

FIG. 10*a* shows the steady state condition for a constant voltage U21 supplied to the input of the limiting block 30. This voltage U21 corresponds to the operational voltage of the generator 10. Into the same limiting block 30 is, of course, also supplied a constant voltage K from a suitable source (not illustrated). The limiting block 30 conditions both voltages, that is the voltage U21 as well as the voltage K, in such a manner that in the output of the block there is a constant voltage U31, as long as there is a certain magnitude of the voltage U21, cp. also FIG. 11. But, if the voltage U21 exceeds a certain value determined by the values of the element used in the limiting block 30 and by adjustment of the variable resistor 215 in the transformation block 20, the limiting block 30 operates so that a further increase of the voltage U21 causes a rather quick decrease of the voltage U31 across the output of the limiting block 30, almost down to zero value. It can therfore be seen that the circuit arrangement in accordance with the invention comes into full action only in the region of change of the voltage U31. The illustrated widths R1 or R2 (see FIG. 11) of this region can be affected by changes in the values of the elements employed in the limiting block 30. In the pulse generator 40 are produced narrow voltage pulses with an amplitude U41 and a period or cycle P, as shown in FIG. 10*c*. After passing through the capacitor 45, the shape and amplitude of these pulses is changed, cp. FIG.

10*d* showing also their total amplitude U42. Superposition of the two voltages U31 and U41 at the junction point 35 produces a voltage U43 the shape of which is shown in FIG. 10*e*.

The voltage U43 enters into the multivibrator block 50 across the output of which are produced pulses with an amplitude U51. The width of these pulses is variable in dependence on the voltage U31, or the voltage U43 which is produced by superposition of the constant voltage U41 and the variable voltage U31. The method of controlling the pulse width across the output of the multivibrator block 50 will be described in more detail below. It should be noted that if the voltage U31 is low, corresponding, in accordance with FIG. 11, to a high voltage U21, there are produced narrow pulses, for example of a width A, cp. FIG. 10*f*; if the voltage U31 increases, the pulse width also increases, as shown by B in FIG. 10*g*; and finally, for maximum voltage U31 which, in accordance with FIG. 11 corresponds to a low voltage U21, the pulse width C is a maximum, as shown in FIG. 10*h*.

The above described pulses with a variable width are introduced into the control block 60 which is also supplied through the line 81 with the magnetizing current from source 80 of the magnetizing current.

FIG. 12 illustrates the action of the control block 60 in dependence on the various pulse width across its input. The FIGS. 12*f*, 12*g*, 12*h*, correspond to the FIGS. 10*f*, 10*g*, 10*h*, except for the fact that they have been drawn on a larger scale for clarity's sake. For the duration of each pulse U51, the magnetizing current increases in accordance with the curve N, while during the time period between two adjacent pulses U51, the magnetizing current decreases in accordance with the curve M. The shapes of the two curves N and M are given by the time constants of the entire circuit of the magnetizing winding of the current transformers. In the case of an uninterrupted sequence of the pulses U51, the respective sections of the curves N and M follow one upon the other. Due to different widths A to C of the pulses U51, there are also produced different courses of the magnetizing current, cp. FIGS. 12*f*, 12*g* and 12*h*. Due to the inductive load in the circuit, there occurs after an initial increase, a certain smoothing of these current waves appearing as a mean value IMS of the magnetizing current.

Referring now to FIG. 3, the limiting block 30 and its function will be explained in more detail.

The limiting block 30 has two input terminals 351 and 352, two output terminals 361 and 362, and two terminals 391 and 392 for supplying the constant voltage K. Substantial elements of the limiting block 30 are: a transistor 310 and two Zener diodes 320 and 330 which are connected in the following manner: the emitter 313 of the transistor 310 is directly connected with one input terminal 351. The base 311 of the transistor is connected with the same input terminal 351 indirectly through the resistor 301. The base 311 is also connected with the other input terminal 352 through the Zener diode 320 which passes current in this circuit connection base 311 terminal 352. The emitter 313 is connected, on the one hand, with one output terminal 361 and one terminal 391 for supplying the constant voltage K, and, on the other hand through the second Zener diode 330 which is connected in the current conductive or forward direction, through a stabilization resistor 303 with the second terminal 392 for supplying the constant voltage K. The collector 312 is connected, on the one hand, directly with the second output terminal 362, and, on the other hand, through the working resistor 302 with the junction point 331 between the second Zener diode 330 and the stabilization resistor 303.

The transistor 310 operates as a single stage amplifier with excitation of the base 311 through the Zener diode 320. The transistor 310 operates through the working resistor 302 which is connected in the junction point 331 with the stabilized voltage. The stabilization circuit proper is here formed by the Zener diode 330 and the stabilization resistor 303.

If the voltage U21 across the input terminals 351 and 352 is lower than the voltage of the Zener diode 320, no current passes through the base 311, the transistor 310 is therefore cut-off, and, consequently, its collector 312 and the second output terminal 362 have the full voltage of the junction point 331. If the voltage U21 across the input terminals 351 and 352 exceeds the voltage of the Zener diode 320, the transistor 310 begins to pass current. Consequently, the voltage on its collector 312 (and thus also on the second output terminal 362) is reduced by the voltage drop produced across the working resistor 302.

The pulse generator 40 and its function will be explained with reference to FIG. 4.

The pulse generator 40 has two output terminals 461 and 462, and two terminals 491 and 492 for supplying the constant voltage K. Its substantial elements are three transistors 410, 420 and 430. All emitters are connected, on the hand, with one output terminal 461, and, on the other hand, with one terminal 491 for supplying the constant voltage K. The second terminal 492 of the supply of the constant voltage K is connected with the bases 411 and 421 of the first two transistors 410 and 420 through the respective resistors 418 and 428. The collector 412 and 422 of the same transistors 410 and 420 are connected with the same terminal 492 through the respective resistors 415 and 425. With the same terminal 492 is also connected through the working resistor 435 the collector 432 of the third transistor 430. This collector 432 is also connected with the second output terminal 462.

The couplings between the transistors 410, 420 and 430 are accomplished in the following manner:

A coupling capacitor 417 is interposed between the base 411 of the first transistor 410 and the collector 422 of the second transistor 420. Another coupling capacitor 416 is interposed between the collector 412 of the first transistor 410 and the base 421 of the second transistor 420. Between the collector 422 of the second transistor 420 and the base 431 of the third transistor 430 lies the resistor 438 which is actually the resistance of the base 431 of this third transistor 430. The transistors 410 and 420 form a so called astable multivibrator which produces current pulses the repetition period or frequency P of which is given, on the one hand, by the values of the resistors 415, 418 and 428, on the other hand, by the values of the capacitors 416 and 417. The third transistor acts as an amplifier because standard multivibrator circuit arrangements cannot be loaded. The transistor 430 also reverses the phase of the signal which has an amplitude U41 and a shape as illustrated in FIG. 10*c*.

Figure 5:
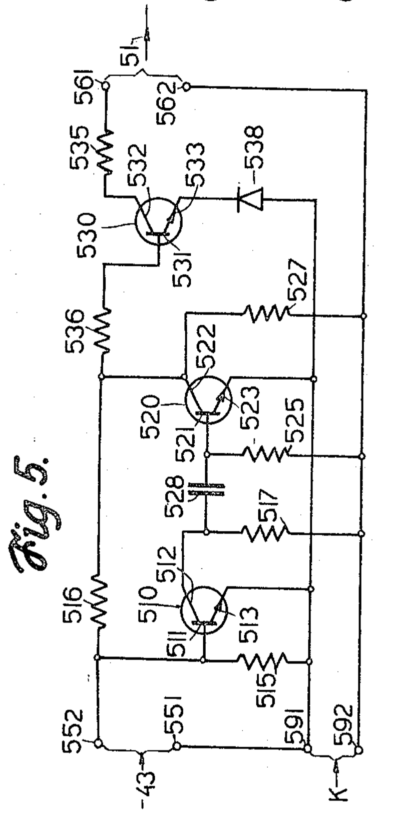
FIG. 5 shows in more detail the monostable multivibrator used in the circuit arrangement of FIG. 1.

The monostable multivibrator 50 and its function will be explained with reference to FIG. 5.

The monostable multivibrator 50 has two input terminals 551 and 552, two output terminals 561 and 562, and two terminals 591 and 592 for supplying the constant voltage K. Its essential features are three transistors 510, 520 and 530 and a diode 538. The latter connects in the forward direction the emitter 533 of the third transistor 530 with one terminal 591 for supplying the constant voltage K. This terminal 591 is further directly connected with both emitters 513, 523, respectively, of the first two transistors 510, 520, respectively, and with one input terminal 551. The second input terminal 552 is connected directly with the base 511 of the first transistor 510, and through the coupling resistor 516, with the collector 522 of the second transistor 520, and, through the resistor 536, also with the base 531 of the third transistor 530. The collector 532 of the transistor 530 is connected through the working resistor 535 with one output terminal 561. The second output terminal 562 is connected with the second terminal 592 of the supply of the constant voltage K, and, through the resistor 517, 527, respectively, with the collector 512, 522, respectively, of the first two transistors 510, 520, respectively. The second output terminal 562 is also connected through the resistor 525 with the base 521 of the second transistor 520. This base 521 is connected through the coupling capacitor 528 with the collector 512 of the first transistor 510 of which the base 511 and the emitter 513 are connected through the resistor 515.

The transistors 510 and 520 form a so-called base controlled monostable multivibrator. The third transistor 530 acts as amplifier and phase inverter. The frequency or time period P of the pulses coming out from the monostable multivibrator 50 is the same as the frequency of the pulses entering this monostable multivibrator 50. But the width A to C of the outgoing pulses U51 changes in accordance with the voltage across the coupling capacitor 528. In the case of a maximum change in the voltage U43 which appears as the voltage of the collector 512 of the first transistor 510 in the fully conductive state, the second transistor 520 is kept cut-off, and the pulses U51 have a maximum width C. If the change in the voltage U43 is reduced, the transistor 510 becomes opened only partially, and there is a lower voltage across the coupling capacitor 528. Consequently, the second transistor 520 is kept cut-off only for a shorter period of time, so that the width of the pulses U51 is reduced to B or A, respectively.

Due to the fact that the width of the pulses U51 is a decisive factor of the entire control, it is necessary that their edges be as steep as possible. For this purpose a diode 538 is connected in the circuit of the emitter 533 of the third transistor 530, in the forward direction. This diode 538 improved the slope of the edges of the rectangular pulses U51.

The inverting network 55 and its function will be explained with reference to FIG. 13.

The inverting network 55 is formed by the transistor 570 the base of which 571 is fed, through the resistor 575, from the output terminal 561 of the monostable multivibrator 50. The emitter 572 of the transistor 570 is supplied with a positive constant voltage K. The collector 573 is supplied, through the working resistor 574, with a negative constant voltage K. The collector 573 is also connected with the input terminal 651 of the regulation block 60. The transistor 570 accomplishes in this circuit arrangement the inversion of the signal reaching its base 571.

Figure 6:
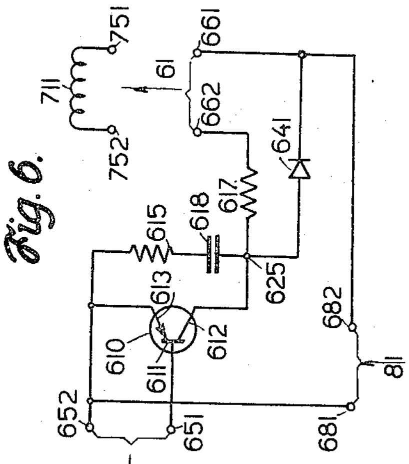
FIG. 6 shows in more detail the circuit arrangement of the control block used in the circuit arrangement of FIG. 1.

The control block 60 and its function will be explained with reference to FIG. 6.

The control block 60 has two input terminals 651 and 652 of the control circuit, and two input terminals 681, 682, and two output terminals 661, 662 of the circuit of the magnetization winding. Substantial elements of the control circuit are the transistor 610 and the diode 641. It should be noted that the inductive load 711 connected in the circuit of the magnetization winding is also important for the function of the control block 60, but this load is usually located outside the control block 60.

The base 611 of the transistor 610 is connected with one terminal 651 of the control circuit. The second terminal 652 of this control circuit is connected with the emitter 613 of the transistor 610, and also with one input terminal 681 of the circuit of the magnetization winding the second input terminal of which is connected with one of its output terminals 661. The collector 612 of the transistor 610 is connected with the emitter 613 of the transistor 610 through the junction point 625 and the capacitor 618 and the resistor 615 connected in series with the latter capacitor. The junction point 625 is also connected through the diode 641 with one output terminal 661 of the circuit of the magnetization winding, and through the resistor 617 with the second output terminal 662 of the circuit of the magnetization winding.

The transistor 610 operates in the amplifier circuit as a controlled semiconductor element, the capacitor 618 and resistor 615 forming therefore a protective over-voltage circuit. In the junction point 625 which is connected with the collector 612 the voltage has a rectangular shape with overshooting peaks of the leading edges. The undesirable entry of these overshooting peaks into the transistor 610 is eliminated by the capacitor 618 and the resistor 615.

The transistor 610 operates through the resistor 617 into the inductive load 711 with two input terminals 751, 752, respectively, connected with the output terminals 661, 662, respectively, of the circuit of the magnetization winding. The energy collected in the inductive lead 711 discharges in one direction through the diode 641.

When the transistor 610 becomes conductive, the circuit of the magnetization winding which is fed from the source 80 of the magnetization current, is completed in the following manner:

First input terminal 681 of the circuit of the magnetization winding, emitter 613 and collector 612 of the transistor 610, junction point 625, resistor 617, second output terminal 662 of the circuit of the magnetization winding, second terminal 752 of the inductive load 711, and first terminal 751 of the inductive load 711, first output terminal 661 of the circuit of the magnetization winding and second input terminal 682 of the circuit of the magnetization winding.

If the transistor 610 is cut-off, the circuit of the magnetization winding is disconnected from the source of the magnetization current 80, and, starting from the junction point 625, the circuit of the magnetization winding is completed in the following manner:

Resistor 617, second output terminal 662 of the circuit of the magnetization winding, second terminal 662 of the circuit of the magnetization winding, second terminal 752 of the inductive load, inductive load 711 and its first terminal 751, first output terminal 661 of the circuit of the magnetization winding, diode 641, and back into the junction point 625.

Various embodiments of the load and applications thereof will now be described.

Figure 7:
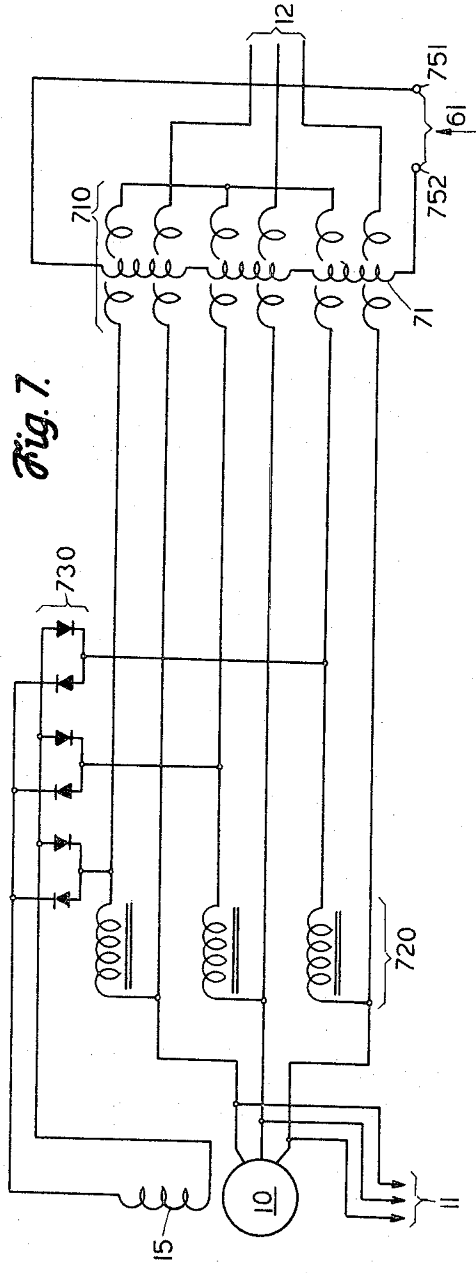
FIG. 7 shows in more detail the circuit diagram of the source block used in the circuit arrangement of FIG. 1.

FIG. 1 illustrates schematically the overall arrangement with the source control block 70 into which the line 61 supplies the magnetization current from the control block 60. A more detailed example of embodiment is illustrated in FIG. 7. The inductive load 711 is here formed by a multi-section pre-magnetization winding 71 of the three-phase current transformer 710. Its primary winding is connected in the line 12 fed from the controlled source 10, in the present case from a synchronous compound generator. Its secondary windings are connected with linear chokes 720 and the rectifiers 730. The filed winding 15 of the controlled source 10 then feeds the output of the rectifier 730.

Figures 8, 9:
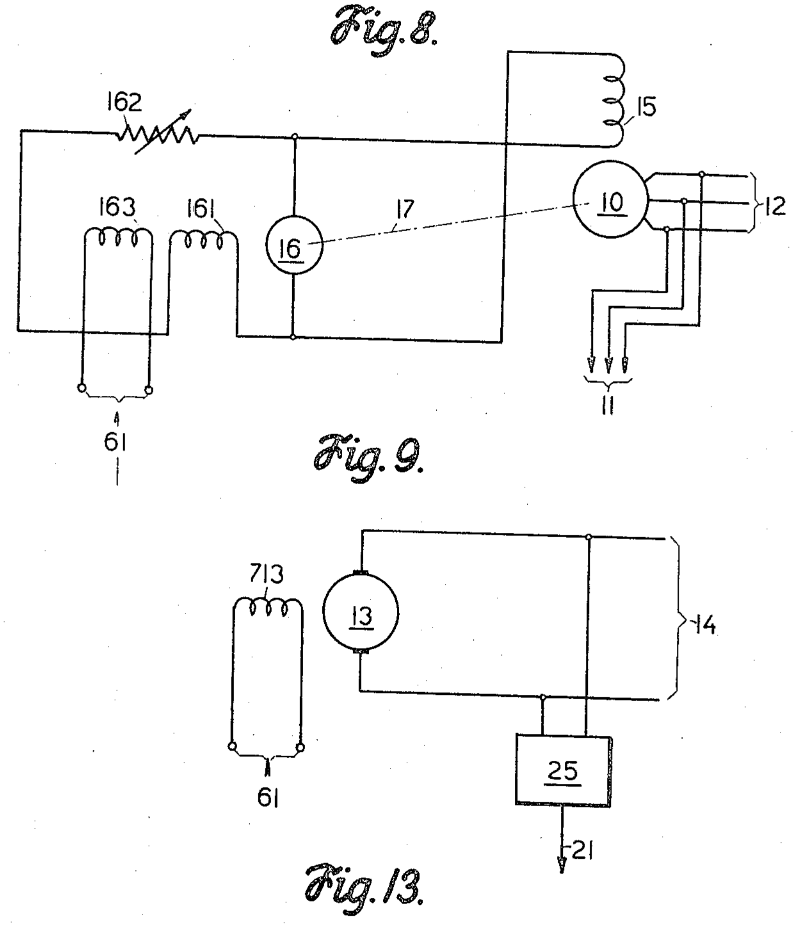
FIG. 8 shows the circuit arrangement for controlling the exciting dynamo connected with the synchronous generator.
FIG. 9 shows the circuit arrangement for controlling a direct current dynamo.

FIG. 8 shows the case of controlling a generator 10 provided with a field winding 15 fed from the exciting dynamo 16 connected by means of a mechanical coupling 17 with the rotor of the generator 10. In the exciting or field circuit of the generator 10 is interposed a control resistor 162 and part 161 of the field winding of the exciting dynamo 16. The second part 163 of this field winding is connected in the magnetization circuit forming a part of the circuit in accordance with the invention.

FIG. 9 shows a circuit arrangement in which the inductive load 711 is formed directly by the field winding 713 of the controlled voltage source 13. Such a source may also be provided by a direct current dynamo feeding the line 14. In such a case, the original transformation block 20 is replaced by the block 25 in which is not only adjusted a suitable level of the direct current output voltage U21, but its ripple is also smoothed out. In the embodiment according to FIGS. 8 and 9, the magnetization current is also the field current, and this means that their is a direct relationship between the two currents. Therefore, in these embodiments no inverting network 55 is arranged in the line 51.

The circuit arrangement in accordance with the invention may not only be used for controlling large units, for example large synchronous compound generators, but it may also be used for various control circuit arrangements used, for example, in automation. The magnetization current which changes in the circuit arrangement in accordance with the invention accurately in dependence on the source voltage, may, for example, control the element which drives the voltage source, that is in the actual case, for example, the magnetization current may for example control the excitation of a D.C. electromotor and the like. In a similar manner, the magnetization current might control the converter of a gate valve in a water turbine to which a suitable tachometric dynamo could be mechanically connected.

What I claim is:

1. Voltage control circuit arrangement, especially for voltage control of synchronous compound generators, comprising in combination:

(a) a control circuit consisting of a limiting block, a monostable multivibrator and a control block, said parts being in series connection;
(b) a pulse generator being connected through a capacitor with said control circuit by means of a junction point placed between the limiting block and the monostable multivibrator;
(c) a connection line between the input of the limiting block and a controlled source of voltage;
(d) a source of a magnetization current connected with said control block, said control block controlling the magnetization current in dependance on a width of pulses supplied to said control block;
(e) a source control block, the input of which being connected with the input of said control block;
(f) a source of constant voltage, the output of which being connected with the inputs of said limiting block, said pulse generator and said monostable multivibrator.

2. Voltage control circuit arrangement as claimed in claim 1, the control circuit of which being supplemented by means of an inverting network, said inverting network being interposed between the multivibrator block and the control block and connected with said pulse generator.

3. Voltage control circuit arrangement as claimed in claim 1, the limiting block of which is provided with input terminals, output terminals and terminals for supplying the constant voltage said limiting block comprises a transistor, two Zener diodes, the emitter of the transistor being directly connected with one input terminal, the base of the transistor being connected indirectly through a resistor with said input terminal, the said base being also connected by means of the first Zener diode—which is arranged in the forward direction—with the second input terminal, said emitter of the transistor being connected with first output terminal, with one terminal for supplying the constant voltage pulses, and through the second Zener diode—which is connected in forward direction—and through a stabilisation resistor with the second terminal for supplying the constant voltage, while the collector of the transistor is connected directly with the second output terminal and also indirectly—through a working resistor—with the junction point between the second Zener diode and a stabilization resistor.

4. Voltage control circuit arrangement as claimed in claim 1, the pulse generator of which is provided with two output terminals and with terminals for supplying the constant voltage pulses, said pulse generator comprises three transistors whose emitters are connected with one input terminal and with one terminal for supplying the constant voltage, while with the second terminal of the supply of the constant voltage are connected:

(a) through respective resistors the collectors of the first two transistors,
(b) through a working resistor the collector of the third transistor, said collector of the third transistor being connected with the second output terminal, couplings between said three transistors being arranged in such a manner that a coupling capacitor is interposed between the base of the first transistor and the collector of the second transistor, a further coupling capacitor being interposed between the collector of the first transistor and the base of the second transistor, a resistance of the base of said third transistor being interconnected between the collector of said second transistor and the base of said third transistor.

5. Voltage control circuit arrangement as claimed in claim 1, the monostable multivibrator of which is provided with two input terminals, with two output terminals and with terminals for supplying the constant voltage, said monostable multivibrator comprises three transistors and a diode connecting in its forward direction the emitter of said third transistor with one terminal for supplying the constant voltage pulses, said second input terminal is connected:

(a) immediately with the base of said first transistor, (b) through a coupling resistor with the collector of said second transistor and also through a resistor with the base of said third transistor, the collector of which is connected through a working resistor with one output terminal, while the second output terminal is connected with the second terminal for supplying the constant voltage, while the second output terminal is connected:

(c) immediately with the second terminal for supplying the constant voltage, (d) through respective resistors with the collectors of said first two transistors, (e) through a resistor with the base of said second transistor, the base of which is connected by means of a coupling capacitor with the collector of said first transistor, the base and the emitter of which are coupled by means of a resistor.

6. Voltage control circuit arrangement as claimed in claim 1, the control block of which is provided with input terminals for the control circuit, with input terminals and output terminals for a magnetization circuit, said control block comprises a transistor and a diode, the base of said transistor being connected with one input terminal for the control circuit, the second terminal for which is connected:

(a) immediately with one input terminal for said magnetization circuit and with the emitter of said transistor, (b) through a resistor and a capacitor with a junction point, said resistor and said capacitor being connected in series, said junction point is connected:

(c) with the collector of said transistor, (d) through said diode with one output terminal for said magnetization circuit, said output terminal being connected with second terminal for said magnetization circuit, (e) through a resistor with second output terminal for said magnetization circuit, said output terminals for said magnetization circuit are connected with an inductive load which is an active member for a source control block.

7. Voltage control circuit as claimed in claim 6, the inductive load of which is formed by means of a premagnetization winding of a current transformer which is interconnected in a line fed from the controlled source of alternating voltage, the field winding of the controlled source being connected with said current transformer through a rectifying block.

8. Voltage control circuit as claimed in claim 6, the inductive load of which is formed by at least a part of the field winding of an exciting dynamo which is mechanically coupled with the controlled voltage source.

9. Voltage control circuit as claimed in claim 6, the inductive load of which is directly formed by a field winding of the controlled voltage source.

10. Voltage control circuit arrangement as claimed in claim 1, the control circuit of which is supplemented by means of a transformation block, said transformation block being arranged between the output of the source of voltage and the limiting block, said transformation block comprising in combination:

(a) an input transformer, (b) a group of half-wave rectifiers, (c) a smoothing filter across the output terminals of said transformation block, (d) a variable resistor arranged across said output terminals.

References Cited

UNITED STATES PATENTS

| | | | |
|---|---|---|---|
| 3,200,323 | 8/1965 | Faulkes | 322—28 |
| 3,231,757 | 1/1966 | Rainer et al. | 322—28 X |

MILTON O. HIRSHFIELD, *Primary Examiner.*

J. D. TRAMMEL, *Assistant Examiner.*